INVENTOR.
Elihu C. Jerabek

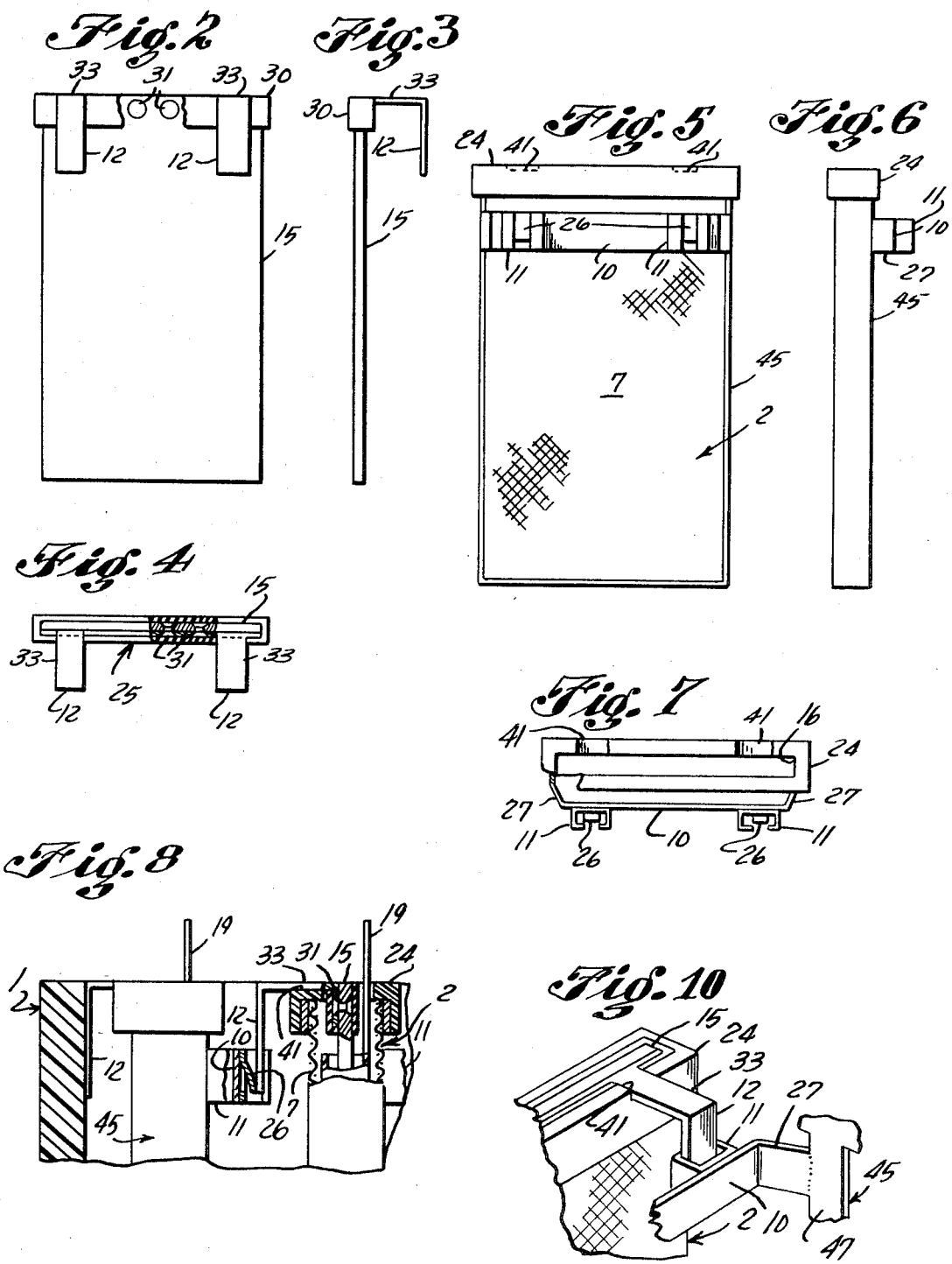

United States Patent Office 3,592,692
Patented July 13, 1971

3,592,692
APPARATUS FOR BATTERY CELL CONNECTIONS
Elihu C. Jerabek, Delmar, N.Y., assignor to the United States of America as represented by the Secretary of the Navy
Filed Feb. 19, 1970, Ser. No. 12,653
Int. Cl. H01m 5/00, 27/00
U.S. Cl. 136—86                                    4 Claims

ABSTRACT OF THE DISCLOSURE

A method and apparatus are disclosed for making intercell connections in a metal-air battery wherein the metal electrode is removed and another inserted. The connection utilizes integral or added parts of the anode and cathode in a low impedance sliding contact. This contact is of low mass, impossible to misconnect, protected from corrosion, does not impede access of air to the air electrode and requires no other wiring to connect the individual cells of the battery in series.

---

The invention described herein may be manufactured and used by or for the Government of the United States of America for governmental purposes without the payment of any royalties thereon or therefor.

This invention relates to battery construction and, more particularly, to a method and apparatus for serially connecting the individual cells which make up the battery.

In either primary or secondary batteries which employ a multiplicity of individual, flat cells, there is a requirement that the cells when in place be electrically connected in series. While there are various ways of interconnecting these cells, all of these interconnection systems require external circuits. The subject invention utilizes the anode and cathode structures of each individual cell and provides extensions thereto so that the cells are automatically connected in series when they are in place.

While the interconnection method and apparatus described herein may be used in any type of multicell battery, it is of particular use in mechanically rechargeable primary metal-air cells where the battery is recharged either by the insertion of new cells or by the insertion of fresh anodes into the old cells. Metal air cells of this type are described in U.S. Pats. 3,457,115 to C. E. Kent, issued July 22, 1969; 3,436,270 to H. G. Oswin et al., issued Apr. 1, 1969; and 3,378,406 to M. G. Rosansky, issued Apr. 16, 1968. The method of connection described hereinafter permits the mechanical recharging of these cells in a one-step operation whereby the fresh anode is inserted and is simultaneously connected to an adjacent cathode. By use of the subject apparatus, proper cell spacing and insulation are maintained while at the same time a low impedance connection is made between the anode of one of the cells and the cathode of another.

The connectors described herein have numerous advantages over conventional battery connectors. They provide a quick connect and disconnect ability with very low contact resistance. The contact surface area can be increased or decreased according to the individual requirements of the battery. The connectors are of the bayonet type in which the blade is an extension of the anode and the sheath is an extension of the cathode. When a multiplicity of cells are connected in a battery, the connector arrangement described herein takes up no battery volume and adds no height or width. The connectors add little weight while at the same time have a high current carrying capability. The connectors when used with metal-air batteries of the type to be described are plated for corrosion resistance. They prevent electrolyte leakage. As hereinafter described, the cell connection is made exterior to the cell and not in the electrolyte. Furthermore, the male and female contacts can be made integral to the anode and cathode. In the case of metal-air cells, the connecting apparatus does not block the air flow to any of the individual cells. In sum, the subject method and apparatus make possible the interconnection of the individual cells in a battery with such reliability that the battery may be mechanically recharged by unskilled personnel.

If the battery is of the mechaniaclly rechargeable type, it may be recharged and connected by the mere insertion of fresh anodes into each cell. Because of bayonet-type construction, there can be no misconnection of the fresh anodes to the cathodes of succeeding cells during recharging.

It is therefore an object of this invention to provide a method of interconnecting the individual cells of a battery without external circuits.

It is a further object of this invention to provide bayonet-type connecting apparatus attached to the cathodes and anodes of individual cells making up a battery to serially connect these cells when each of the cathodes and anodes is properly in place.

It is another object of this invention to provide mating connectors for mechanically rechargeable metal-air cells which serially connect the cathodes and the anodes of the cells making up a metal-air battery while at the same time maintaining the spacing between each of the cells in the battery.

It is a still further object of this invention to provide a method for quick connecting and disconnecting the individual cells in a multicell battery.

It is still another object of this invention to provide mechanically rechargeable primary cells with a fresh anode and connector clip assembly which permits the connecting of this anode with an adjacent cathode receptacle connector when the anode package is inserted into an adjacent battery cell.

It is another object of this invention to provide a battery having a multiplicity of cells with a method of interconnecting these cells such that the anode of one cell is connected to the cathode of another cell by apparatus integral to the anode such that this integral apparatus extends from this anode to the cathode of an adjacent cell where it mates with a connector affixed to the cathode thereby providing both the connection and spacing of adjacent cells.

Other objects, advantages and novel features of the invention will become apparent from the following detailed description thereof when considered in conjunction with the accompanying drawings in which like numerals represent like parts throughout and wherein:

FIGS. 2, 3 and 4 show front and side elevations and a top plan view of one of the anode elements used in mechanically recharging the battery shown in FIG. 1;

FIGS. 5, 6 and 7 show front and side elevations and a top plan view of an air cathode used in the battery shown in FIG. 1;

FIG. 8 is a sectional view taken on line 8—8 of FIG. 1;

FIG. 10 is a fragmentary perspective view of one end of the cell and anode assembly, assembled with a portion of the adjacent frame and clip assembly shown.

Figure 1:
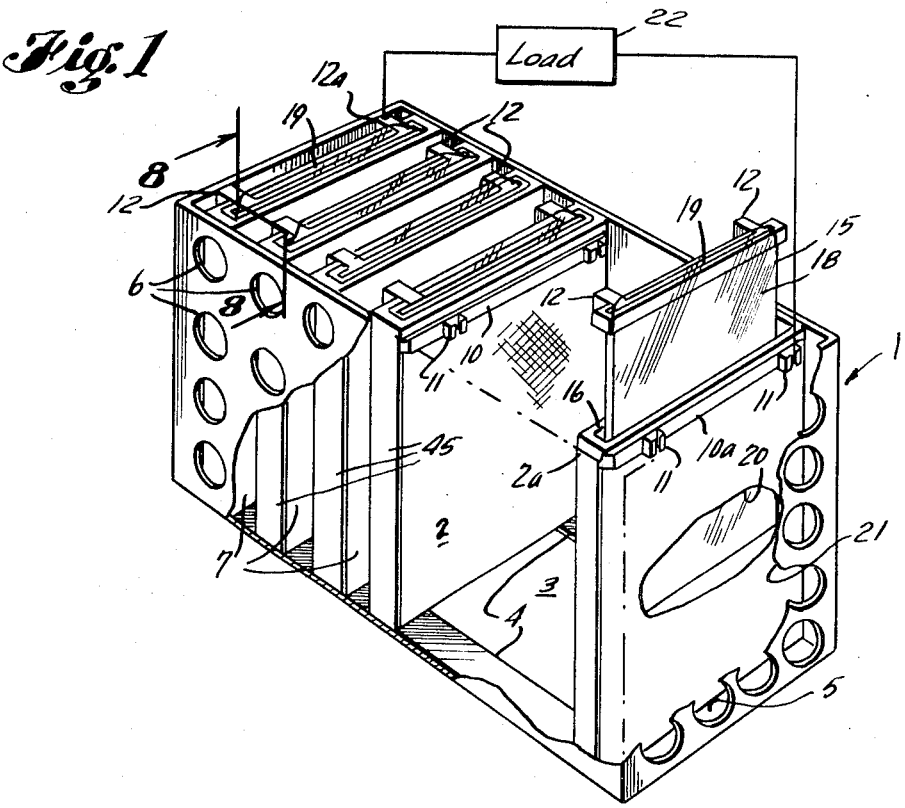
FIG. 1 is a diagrammatic perspective view of a preferred form of the invention showing the recharging of a metal-air battery having a plurality of cells.

Referring to FIG. 1, a battery casing 1 is shown housing a plurality of flat metal-air cells 2. At the bottom of the casing is an open space 3 which is defined by ridges 4 and 5. This battery casing is usually of a plastic material and is unitary in construction. Punched into the sides and the ends of the battery casing are holes 6 which in conjunction with open area 3 provide a flow of air which impinges on the sides of cells 2. In the type of battery shown, cells 2 are oxygen-depolarized cells which have outer walls 7 that permit the air circulating in the battery to mix with the electrolyte contained within the cell while preventing the electrolyte from passing therethrough. These side walls also form the cathode of the cell. Construction of these cathodes, commonly known as air cathodes, is shown in U.S. Patent 3,297,484 to L. W. Niedrach, issued Jan. 10, 1967. Attached to these air cathodes is a connector strip 10 on which are located upstanding bayonet sheaths or sleeves 11. The ends of these connector strips are attached to the air cathode so as to provide an electrical connection between the cathode and bayonet sheaths 11. Connector clips 12 on the anodes of adjacent cells are inserted into the sheaths. These clips are either an L-shaped integral part of the anode 15 shown inserted into cell 2a or are mechanically connected thereto in some appropriate manner. The battery shown in FIG. 1 may be recharged merely by inserting fresh anodes into slots 16 of the cell. When these anodes are properly inserted, connector clips 12 will mate with the appropriate sheaths 11 of the next adjacent cell, thus connecting the anodes in series with cathodes of adjacent cells. Anode 15 is shown encased in a cellophane envelope 18 which serves as a separator. The top portion of this separator, designated 19, is a tab portion. The entire anode and connector clip apparatus may be withdrawn from the cell by merely pulling on tab 19. In this manner, spent anodes are removed from the battery. A portion of this entire package can be seen inserted into cell 2a through cutaway 20. The cell 2a itself may be seen inserted into battery casing 1 through cutaway 21. When the battery is completed by inserting all of the cells and all of the anodes, external connection from the battery to load 22 may be accomplished by connecting leads from the load to strip 10a and clip 12a as shown in FIG. 1. In one embodiment (not shown), each of the individual cells is separated by a plastic rib which is integral to the casing. This plastic rib separates the individual cells so that air flowing from area 3 through holes 6 may contact the air electrodes. These plastic ribs are reinforced by clips 12 in conjunction with bayonet sheaths 11 since the anode is firmly wedged in the cell. In addition, because of the insulation on the top of cells 2, shown in FIGS. 5, 6 and 7, the cells are not only spaced from each other but are also electrically insulated one from the other. It will be appreciated that the electrical connection between the cells is made external to the battery cell itself in that the connection is completely free of the electrolyte used in the battery. Although this connection is external to the cell, no additional external circuitry is necessary to make the connection.

Figure 9:
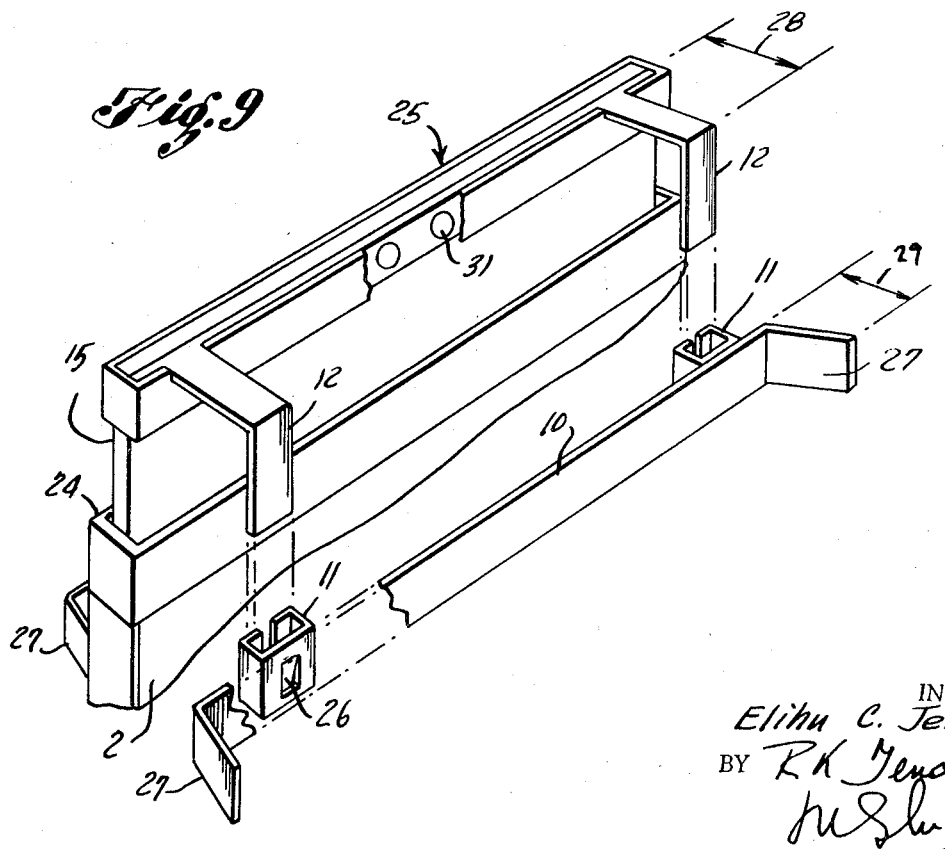
FIG. 9 is a fragmentary, exploded perspective view of the top of the cell and anode assembly.

This connection can best be described by referring to FIG. 9. In FIG. 9, a cell 2, similar to those shown in FIG. 1, is provided with an insulating top member 24. Into this cell is inserted a metal anode 15, similar to that shown in FIG. 1, with an anode clip assembly 25 bonded to the top portion thereof. This assembly is provided with two connector clips or tabs 12. The number of tabs may be increased or decreased depending on the current load for which the battery is designed. If anode 15 is made from zinc or magnesium, the anode clip assembly 25 may be integral thereto and may be formed merely by bending the upper part of an appropriately cut anode. In the case of magnesium, this is accomplished by simple bending after the magnesium has been heated to the softening point. Assembly 25 may be either integral to or welded, riveted or brazed to a metal anode. In another configuration, this clip assembly may be made in a separate unit constructed from nickel. The contacts 12 are cadmium plated in the preferred embodiment.

As the anode and connector assemblies are inserted into cell 2, the connector clips 12 will mate with receptacles or bayonet sheaths 11 and will be locked into these sheaths by leaf springs 26 which may be formed integrally when bar 10 is cut. Bar 10 is formed also from nickel in the preferred embodiment and is shaped so as to form bent portions 27. These bent portions are mechanically bonded to the air cathodes as shown in FIGS. 5, 6 and 7. Spacing between the cells is accomplished by the length of the horizontal portion of clip 12 shown by arrow 28 and by the distance shown by arrow 29.

FIG. 10 is a fragmentary prospective view showing anode clip 12 inserted into bayonet sheath 11 of an adjacent cathode connection member. The spacing between the cells is determined by the length of the horizontal member 33 from which the downwardly depending clip portion 12 extends. In this figure, anode clip assembly 25 is seen bonded to anode 15. Horizontal member 33 is shown to overlie insulating member 24 which insulates the anode from cell 2. Bayonet sheath 11 is shown integrally formed with bar 10 whose bent portion is welded to frame 45 at 47. As described hereinafter, frame 45 is a structural member which supports the air cathode members 7 shown in FIG. 5. Bent portion 27 on bar 10 also spaces one adjacent cell from another when clip 12 is inserted into shealth 11.

From FIGS. 9 and 10 it will be appreciated that there will be only one way in which anode 15 can be inserted in order to connect with an adjacent cathode connecting member. It will thus be appreciated that rapid connection and removal of the anodes are made possible by the subject bayonet connector arrangement.

The construction of the anode and cathode structures is shown in FIGS. 2 through 7. In FIGS. 2, 3 and 4, a metal anode 15 is shown. In metal-air cells, this anode is a highly active metal such as zinc or magnesium. The length and width of this anode are such that it fits within opening 16 of the cell and extends downwardly. When the anode is placed in the cell, the bottom edge of the anode is spaced from the bottom of the cell to prevent cell shorting. The extension of the anode into the cell is limited by portion 33 of clip assembly 25 which rests against insulating top member 24 of the cell. In the configuration shown in FIGS. 2, 3 and 4, the clip assembly 25 is riveted to the top portion of anode 15 by rivets 31. After the assembly is riveted to the anode, an insulating black paint 30 is deposited so as to completely cover that portion of assembly 25 which is immediately adjacent the anode. This black paint is both chemically and electrically insulating and in one configuration is an ether based neoprene paint.

It will be appreciated that insulating paint coating 30 is physically thin so that this painted portion of the anode may be inserted through slots 16 when the anode connector is in place. The insulating paint used completely covers all of the top portions of the anode to chemically and electrically insulate it from the cathode. It will also be appreciated that the transverse bar portion of the assembly 25 may be located on either side of the anode. It is shown in FIG. 4 to be on the same side as that of the clip. It may, however, be positioned such that it rests on the side of the anode opposite from that of the clip in which case member 33 of assembly 25 must be elongated to provide the proper clearance. The clip assembly itself is nickel while the clip portion 12 which is inserted into the bayonet sheath is preferably coated with cadmium for better contact and for corrosion resistance. Assembly 25 may be integrally formed when the anode itself is formed, thereby obviating the necessity of bonding a clip to the metal anode.

This anode assembly is inserted into a cell shown diagrammatically in FIGS. 5, 6 and 7. This cell is constructed with cell sides 7 which constitute the aforementioned air cathode. This air cathode is usually a microporous mesh screen composed of nickel on which is coated electrochemically active noble metals with a hydrophobic binder so that the air necessary for the electrochemical reaction may pass therethrough while the electrolyte is maintained solely within the cell. This mesh is calendared along its edges and spot welded to frame 45. When the two air cathodes are welded to frame 45, a chamber is formed into which the anode and electrolyte are placed. On top of this cell is a rubber insulating member 24. As shown in FIG. 7, this member has a slot 16 adapted to receive the anode and serves as both an insulating member and a cushioning member. As an insulating member, it insulates the anode from contact with the cathode and nickel frame. As a cushioning device, slots 41 are cut in this rubber member to receive and support portion 33 of the anode connector clip assembly. The depth of this cut is exactly equal to the thickness of member 33.

Attached to frame 45 is the aforementioned cathode connector strip 10. Bent portions 27 are welded to the upper portions of frame 45 as shown in FIGS. 5 and 6 so that strip 10 is horizontal. As previously mentioned, anode clips 12 are inserted through receptacles 11 and are held in place by leaf springs 26 as shown in FIG. 7. The interior portions of the receptacle and the leaf springs are also coated with cadmium to increase the conductivity and corrosion resistance of the bayonet connection. When the anode is properly in place, supporting members 33 of the anode clip rest against the rubber insulating member 24 at slots 41 and extend outwardly from the cell.

The proper placement and interconnection of the anodes and cathodes described in FIGS. 2 through 7 are shown in FIG. 8. In this figure, two metal-air cells are shown connected anode-to-cathode. In this figure, anode 15 is shown fully inserted into the right-hand cell such that horizontal member 33 rests upon insulating member 24. Because of the adjacent placement of the cells, when anode 15 is fully inserted, the downwardly depending anode clip member 12 is in locking engagement with cathode connector sheath 11. Clip member 12 is spring biased against one of the faces of sheath 11 by leaf spring 26. Anode 15, along with its connector clip assembly, is easily removed from the right-hand cell by pulling on tab 19 which is an extension of the aforementioned cellophane envelope 18. The removal of the anode simultaneously disconnects the two cells. A external connection to the left-hand cell may be made from the battery to a load by merely attaching a wire or other conducting device to left-hand clip 12.

When a series of cells constructed according to the teachings of FIGS. 2 through 7 are inserted in a battery casing of the type shown in FIG. 1, connection of these cells in series will be automatically accomplished without the necessity of additional external circuits. This connector system also provides for spacing of the series of cells and provides a system for conveniently recharging the entire battery.

What is claimed is:

1. Apparatus for connecting metal-air cells in series comprising, in combination:
   an envelope cathode structure having a pair of air cathode members forming the side wall portions thereof;
   an anode plate of reactive metal disposed within said envelope cathode structure,
      said plate having a plurality of L-shaped members projecting horizontally from the top portion thereof and extending over said envelope, the vertical portion of each of said projections depending downwardly outside of said envelope and acting as one of the male elements of an electrical connector;
   means for electrically insulating said anode plate and said L-shaped members from said envelope cathode structure; and
   an electrically conducting element extending across a top portion of said envelope cathode structure and connected to said air cathode members,
      said conducting element being formed with a plurality of upstanding projections, each of said projections terminating in a sleeve portion which acts as one of the female elements of an electrical connector, whereby when said anode is inserted into said envelope cathode structure and said male elements project into the sleeve portions of an adjacent envelope cathode structure of similar construction, the cell formed by said insertion is serially connected to the cathode of said adjacent cell.

2. In a mechanically rechargeable battery having a multiplicity of cells regularly spaced within a battery casing, wherein each of said cells includes an envelope cathode structure and an anode removably mounted within said envelope, apparatus for recharging said battery and for connecting said cells in series comprising, in combination:
   an L-shaped extension formed at the top of the anode in each of said cells,
      said extension projecting horizontally from said anode such that it extends over the envelope into which said anode is inserted, the vertical portion of said extension depending downwardly outside said envelope;
   means for electrically insulating said anode and its L-shaped extension from the envelope cathode structure in which said anode is inserted; and
   an electrically conducting element across a top portion of each envelope cathode structure and connected to the cathode thereof,
      each of said electrically conducting elements being formed with an upstanding projection terminating in a sleeve portion adapted to receive the vertical portion of an L-shaped extension projecting from the anode of an adjacent cell, whereby, whenever said anodes are positioned in said envelope cathode structures such that each extension is aligned above the sleeve portion of an adjacent cell, full insertion of said anodes into said envelopes recharges said battery and serially connects its cells.

3. In a mechanically rechargeable oxygen-depolarized battery having a multiplicity of metal-air cells regularly spaced within a battery casing, wherein each of said cells includes an envelope cathode structure having a pair of air cathode members forming the side wall portions thereof and an anode plate of reactive metal removably mounted within said envelope cathode structure, apparatus for recharging said battery and connecting said cells in series comprising, in combination:
   a plurality of L-shaped extensions formed at the top portion of each anode plate which project horizontally therefrom such that said extensions project over the envelope into which its anode is inserted,
      the vertical portion of each of said extensions depending downwardly outside the envelope over which it projects;
   means for electrically insulating each anode plate and its corresponding L-shaped extensions from the envelope cathode structure with which it is associated; and
   an electrically conducting element extending across a top portion of each envelope cathode structure and connected to the air cathodes thereof,
      each of said electrically conducting elements being formed with a like plurality of upstanding projections and each terminating in a sleeve portion adapted to receive the vertical portions of the L-shaped extensions from the anode of an adjacent cell, whereby, whenever each of said anode plates is positioned in an envelope cathode structure such that said extensions are aligned above the sleeve portions of an adjacent cell, full insertion of said plates into said envelopes both recharges said battery and connects its cells in series.

4. A cell construction for use in mechanically rechargeable batteries comprising, in combination, an envelope cathode structure having a pair of air cathode members forming the sidewall portions thereof;

an anode plate of reactive metal;

a pair of spaced L-shaped brackets attached to the top portion of said anode plate,
  each bracket having a horizontal arm and a downwardly extending vertical arm portion;

an insulating cap secured to the open end of said envelope cathode structure,
  said cap being formed with a longitudinal slot through which said anode plate may pass;

a conducting strap extending across a top portion of said envelope cathode structure on one side thereof and connected to said air cathode members,
  said strap having a mid-length portion which is spaced from said envelope cathode structure and formed with a pair of upstanding projections,
  each of said projections terminating in a sleeve which serves as the female element of an electrical connector, the male element of which corresponds to the terminal part of the vertical arm of an L-shaped bracket;

said insulating cap also being formed with a pair of spaced channels which communicate with said longitudinal slot and extend outwardly therefrom to that side of said envelope cathode structure which is opposite from said conducting strap,
  each of said channels having a shape corresponding to the cross-section of the horizontal arm of an L-shaped bracket, whereby whenever said anode plate is inserted through the longitudinal slot in said insulating cap element into the interior of said envelope cathode structure, portions of the horizontal arms of each of the L-shaped brackets fit into said channels and lock said anode plate within said envelope cathode structure.

References Cited

UNITED STATES PATENTS

| | | | |
|---|---|---|---|
| 3,496,520 | 2/1970 | Reynolds | 136—135 |
| 2,627,534 | 2/1953 | Arboghst | 136—135 |
| 494,359 | 3/1893 | William | 236—87 |

WINSTON A. DOUGLAS, Primary Examiner

H. A. FEELEY, Assistant Examiner

U.S. Cl. X.R.

136—87, 135